United States Patent
Huang et al.

(10) Patent No.: US 10,791,503 B2
(45) Date of Patent: Sep. 29, 2020

(54) METHODS AND APPARATUS FOR OBTAINING SYSTEM MESSAGE, TERMINAL, AND BASE STATION

(71) Applicant: CLOUDMINDS (SHENZHEN) ROBOTICS SYSTEMS CO., LTD., Guangdong (CN)

(72) Inventors: William Xiao-qing Huang, Guangdong (CN); Haitao Jiang, Guangdong (CN); Zhenkai Wang, Guangdong (CN)

(73) Assignee: CLOUDMINDS (SHENZHEN) ROBOTICS SYSTEMS CO., LTD., Shenzhen (CN)

( * ) Notice: Subject to any disclaimer, the term of this patent is extended or adjusted under 35 U.S.C. 154(b) by 0 days.

(21) Appl. No.: 16/477,864

(22) PCT Filed: Mar. 31, 2017

(86) PCT No.: PCT/CN2017/079122
§ 371 (c)(1),
(2) Date: Jul. 12, 2019

(87) PCT Pub. No.: WO2018/176421
PCT Pub. Date: Oct. 4, 2018

(65) Prior Publication Data
US 2020/0128476 A1    Apr. 23, 2020

(51) Int. Cl.
*H04W 48/14*    (2009.01)
*H04W 48/10*    (2009.01)
(Continued)

(52) U.S. Cl.
CPC .......... *H04W 48/14* (2013.01); *H04W 48/10* (2013.01)

(58) Field of Classification Search
CPC ..... H04W 48/14; H04W 48/10; H04W 48/12; H04W 4/06; H04W 24/02
(Continued)

(56) References Cited

U.S. PATENT DOCUMENTS

2015/0264665 A1* 9/2015 Vos .................. H04W 4/70
370/329
2016/0234759 A1  8/2016 Kubota et al.
(Continued)

FOREIGN PATENT DOCUMENTS

CN    102647730 A    8/2012
CN    103179513 A    6/2013
(Continued)

OTHER PUBLICATIONS

ISA State Intellectual Property Office of the People's Republic of China, International Search Report Issued in Application No. PCT/CN2017/079122, dated Sep. 27, 2017, WIPO, 4 pages.
(Continued)

*Primary Examiner* — Michael Y Mapa
(74) *Attorney, Agent, or Firm* — McCoy Russell LLP

(57) ABSTRACT

Disclosed in the present invention are methods and apparatus for obtaining a system message, a terminal, and a base station. The method comprises: after a first basic system message of a current cell sent by a base station is received, determining whether a service system message needs to be obtained; when it is determined that the service system message needs to be obtained, sending, to the base station, a system request message for requesting the service system message; and receiving the service system message sent by the base station according to the system request message.

7 Claims, 3 Drawing Sheets

(51) Int. Cl.
    *H04W 48/12* (2009.01)
    *H04W 4/06* (2009.01)
    *H04W 24/02* (2009.01)

(58) Field of Classification Search
    USPC .............................................. 455/435.1–445
    See application file for complete search history.

(56) References Cited

U.S. PATENT DOCUMENTS

| | | | |
|---|---|---|---|
| 2018/0049107 A1* | 2/2018 | Johansson | H04W 48/10 |
| 2019/0261390 A1* | 8/2019 | Bergqvist | H04W 72/1236 |
| 2020/0022067 A1* | 1/2020 | Pan | H04W 48/14 |

FOREIGN PATENT DOCUMENTS

| | | |
|---|---|---|
| CN | 103796225 A | 5/2014 |
| EP | 2320687 A1 | 5/2011 |
| EP | 2323426 A1 | 5/2011 |
| WO | 2018014728 A1 | 1/2018 |

OTHER PUBLICATIONS

"Delivery of 'Other SI' in NR," Proceedings of the 3GPP TSG-RAN2 Meeting #95bis, Huawei, HiSilicon, Oct. 10, 2016, Kaohsiung, 5 pages.

"Further Considerations on other SI," Proceedings of the 3GPP TSG-RAN WG2 Meeting #96, CMCC, Nov. 14, 2016, Reno, Nevada, 6 pages.

"Signalling for on-demand system information," Proceedings of the 3GPP TSG-RAN WG2 Meeting #97bis, Nokia, Apr. 3, 2017, Spokane, Washington, 7 pages.

European Patent Office, Extended European Search Report Issued in Application No. 17903732.0, dated Oct. 24, 2019, Germany, 10 pages.

"Further consideration on other SI," Proceedings of the 3GPP TSG-RAN WG2 Meeting #96, Nov. 14, 2016, Reno, Nevada, 7 pages.

* cited by examiner

METHODS AND APPARATUS FOR OBTAINING SYSTEM MESSAGE, TERMINAL, AND BASE STATION

CROSS-REFERENCE TO RELATED APPLICATIONS

The present application is a U.S. National Phase of International Patent Application Serial No. PCT/CN2017/079122 entitled "METHODS AND APPARATUS FOR OBTAINING SYSTEM MESSAGE, TERMINAL, AND BASE STATION," filed on Mar. 31, 2017. The entire contents of each of the above-referenced applications are hereby incorporated by reference for all purposes.

TECHNICAL FIELD

The present disclosure relates to the communication field, and more particularly to methods and apparatus for obtaining a system message, a terminal, and a base station.

BACKGROUND AND SUMMARY

In a 4G system, a base station broadcasts all system messages according to different cycles. However, for a 5G system, an ultra-dense networking mode will be adopted, and both a macrocell coverage providing mobility guarantee and a small cell sharing capacity will be in a same area. Therefore, using a macrocell to broadcast a system message of a small cell within its coverage may occur in a 5G system. Thus, if the way of broadcasting all system messages according to different cycles in a 4G system is still used, due to a large amount of data of the broadcast system messages, a large number of occupied resources and a long period, system energy consumption and resource overhead are increased.

In order to solve the above problems, provided in the present disclosure are methods and apparatus for obtaining a system message, a terminal, and a base station.

In order to achieve the above objective, according to a first aspect of an embodiment of the present disclosure, provided is a method, applied to a terminal, for obtaining a system message, the method comprising: after a first basic system message of a current cell sent by a base station is received, determining whether a service system message needs to be obtained; when it is determined that the service system message needs to be obtained, sending, to the base station, a system request message for requesting the service system message; and receiving the service system message sent by the base station according to the system request message.

According to a second aspect of an embodiment of the present disclosure, provided is a method, applied to a base station, for obtaining a system message, the method comprising: receiving a system request message, sent by a terminal, for requesting a service system message; determining a statistical number corresponding to the service system message within a second preset time; and sending the service system message to the terminal according to the statistical number, wherein the statistical number represents a recorded number when the service system message is requested.

According to a third aspect of an embodiment of the present disclosure, provided is a non-transitory computer readable storage medium. The non-transitory computer readable storage medium comprises one or more programs for performing the method according to the first aspect.

According to a fourth aspect of an embodiment of the present disclosure, provided is a terminal, comprising: the non-transitory computer readable storage medium according to the third aspect, and one or more processors for executing programs in the non-transitory computer readable storage medium.

According to a fifth aspect of an embodiment of the present disclosure, provided is a non-transitory computer readable storage medium. The non-transitory computer readable storage medium comprises one or more programs for performing the method according to the second aspect.

According to a sixth aspect of an embodiment of the present disclosure, provided is a base station, comprising: the non-transitory computer readable storage medium according to the fifth aspect, and one or more processors for executing programs in the non-transitory computer readable storage medium.

Using the above technical solutions, after a first basic system message of a current cell sent by a base station is received, it is determined whether a service system message needs to be obtained; when it is determined that the service system message needs to be obtained, a system request message for requesting the service system message is sent to the base station; and the service system message sent by the base station according to the system request message is received. In this way, the base station can flexibly send a system message according to the needs of the terminal, and does not need to periodically send all system messages, thereby reducing system energy consumption and resource overhead.

DETAILED DESCRIPTION

The specific embodiments of the present disclosure will be described in detail below in conjunction with the drawings. It is to be understood that the specific embodiments described herein are only used for illustrating and interpreting the present disclosure and are not intended to limit the present disclosure.

The present disclosure can be applied to a 5G system. After receiving a first basic system message of a current cell sent by a base station, a terminal determines whether a service system message is needed, so as to obtain the service system message according to a decision result. In this way, the terminal can flexibly obtain a service system message according to needs, and does not need to obtain all service system messages from the base station, thereby reducing system energy consumption and resource overhead.

The present disclosure will be described in detail below in conjunction with specific embodiments.

Figure 1:
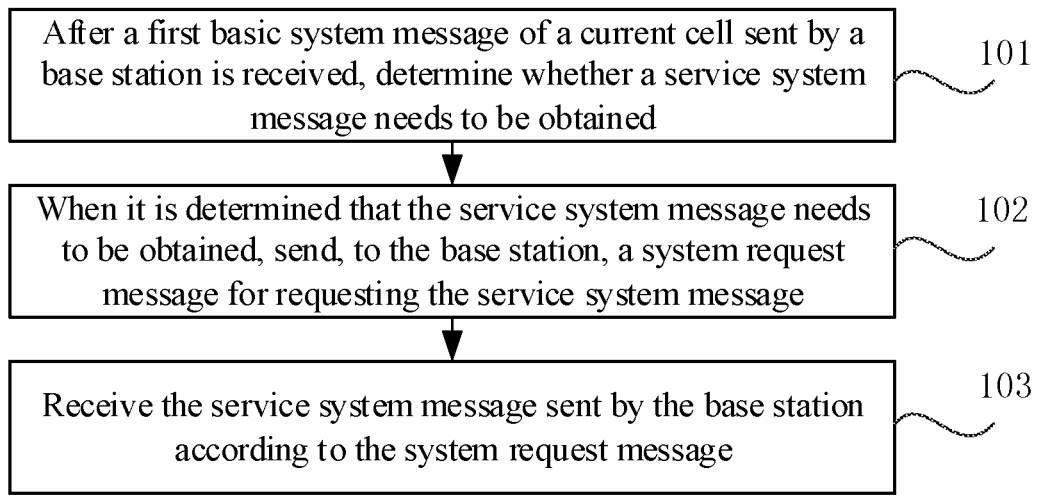
FIG. 1 is a flowchart of a method for obtaining a system message provided by an embodiment of the present disclosure.

FIG. 1 shows a method for obtaining a system message provided by an embodiment of the present disclosure. As shown in FIG. 1, the method is applied to a terminal, the method comprising:

S101, after a first basic system message of a current cell sent by a base station is received, determining whether a service system message needs to be obtained.

Wherein the first basic system message may comprise parameter information required for the terminal to access or camp on the current cell. For example, the first basic system message may comprise information such as a cell downlink bandwidth, a wireless system frame number, and the like. The terminal obtains the first basic system message to ensure that it can access or camp on the current cell. The service system message may be a system message related to terminal mobility or a service requirement, and the service requirement may be a requirement for a service such as inter-device communication, vehicle networking communication, and base station assisted positioning.

S102, when it is determined that the service system message needs to be obtained, sending, to the base station, a system request message for requesting the service system message.

S103, receiving the service system message sent by the base station according to the system request message.

Using the above method, the terminal can flexibly obtain a service system message according to needs, and does not need to obtain all service system messages from the base station, thereby reducing system energy consumption and resource overhead.

Figure 2:
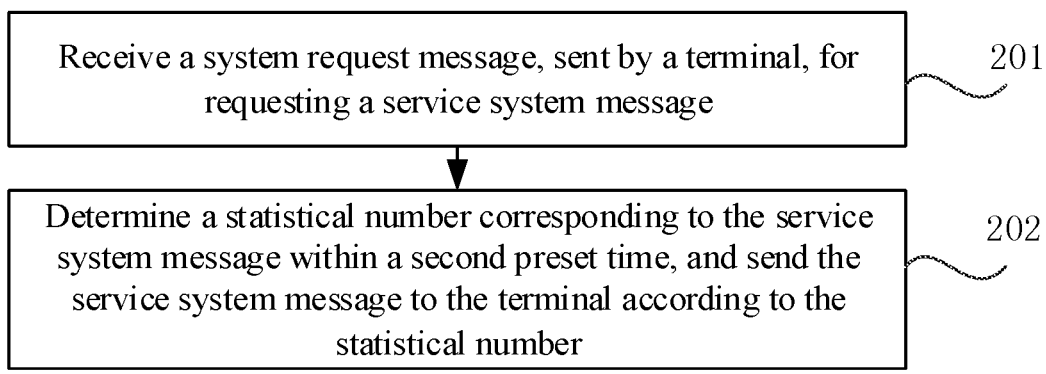
FIG. 2 is another flowchart of a method for obtaining a system message provided by an embodiment of the present disclosure.

FIG. 2 shows a method for obtaining a system message provided by an embodiment of the present disclosure. As shown in FIG. 2, the method is applied to a base station, the method comprising:

S201, receiving a system request message, sent by a terminal, for requesting a service system message.

S202, determining a statistical number corresponding to the service system message within a second preset time, and sending the service system message to the terminal according to the statistical number.

Wherein the statistical number represents a recorded number when the service system message is requested. The statistical number may be a number that the service system message is requested, or may be a number corresponding to a preset request message set containing the service system message. For example, the preset request message set comprises a system request message A, a system request message B, or a system request message C. If the system request message A is received, the number corresponding to the preset request message set is increased by 1. If the system request message B is received, the number corresponding to the preset request message set is also increased by 1. If the system request message C is received, the number corresponding to the preset request message set is still increased by 1. That is, the number corresponding to the preset request message set is the total number requested for each service system message in the preset request message set.

Using the above method, the base station can flexibly send a system message according to the needs of the terminal, and does not need to periodically send all system messages, thereby reducing system energy consumption and resource overhead.

Figure 3:
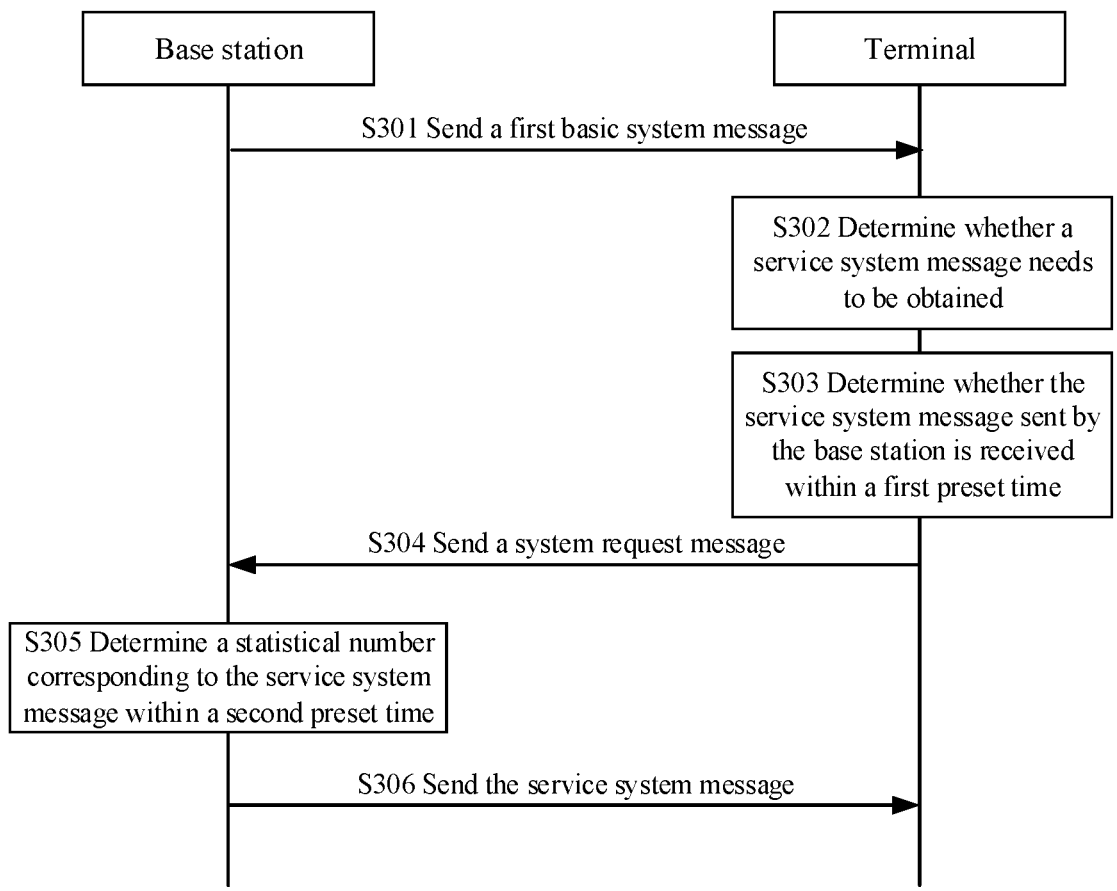
FIG. 3 is yet another flowchart of a method for obtaining a system message provided by an embodiment of the present disclosure.

FIG. 3 shows another system message obtaining method provided by an embodiment of the present disclosure. As shown in FIG. 3, the method comprises:

S301, a terminal receiving a first basic system message of a current cell sent by a base station.

Wherein the current cell is the cell in which the terminal is located, and the first basic system message comprises parameter information required for the terminal to access or camp on the current cell. For example, the first basic system message may comprise information such as a cell downlink bandwidth, a wireless system frame number, and the like.

S302, after the terminal receives the first basic system message sent by the base station, determining whether a service system message needs to be obtained.

Wherein the service system message may be a system message related to terminal mobility or a service requirement, and the service requirement may be a requirement for a service such as inter-device communication, vehicle networking communication, and base station assisted positioning.

In this step, it is determined whether the service system message needs to be obtained by the following conditions:

Condition 1: when the terminal stores other system messages or a second basic system message of a target cell to which the terminal is to be moved, it is determined that the service system message does not need to be obtained.

Condition 2: when the terminal stores neither other system messages nor the second basic system message of the target cell, and the terminal is not moved, it is determined that the service system message does not need to be obtained.

Wherein the second basic system message comprises parameter information required for the terminal to access or camp on the target cell.

Condition 3: when the terminal stores neither other system messages nor the second basic system message of the target cell, and the terminal is not moved, it is determined that the service system message does not need to be obtained.

Condition 4: when the terminal stores neither other system messages nor the second basic system message of the target cell, and the terminal has been moved to the target cell, if a receiving power or a receiving quality of a reference symbol of the current cell is greater than or equal to a first preset threshold, it is determined that the service system message does not need to be obtained.

Wherein the receiving power refers to the signal power intensity of a receiving cell reference symbol, and the receiving quality refers to the signal-to-noise ratio of a receiving cell reference symbol.

Under this condition, although the terminal has been moved, the signal quality of the current cell is good enough, so there is no need to consider cell re-selection or handover, and the service system message does not accordingly need to be obtained.

Condition 5: when the terminal stores neither other system messages nor the second basic system message of the target cell, and the terminal has been moved to the target cell, if a receiving power or a receiving quality of a reference symbol of the current cell is less than the first preset threshold, it is determined that the service system message needs to be obtained.

Condition 6: when the terminal initiates a service requirement, it is determined that the service system message needs to be obtained.

Wherein the service requirement may be a requirement for a service such as inter-device communication, vehicle networking communication, and base station assisted positioning.

In this way, whether a service system message needed is determined by the above conditions. When it is determined that the service system message is needed, step S303 is performed; when it is determined that the service system message is not needed, the service system message is not obtained.

S303, the terminal determining whether the service system message sent by the base station is received within a first preset time.

In the step, when the terminal determines that the service system message needs to be obtained, a timer is started. When the time recorded by the timer is greater than or equal to the first preset time, and the terminal does not receive the service system message sent by the base station, step S304 is performed. When the service system message sent by the base station is received within the first preset time, the service system message is obtained.

S304, the terminal sending a system request message to the base station.

Wherein the system request message is used for requesting a service system message. In this step, the system request message may comprise identification information of a target cell that needs to be requested, a system information identifier (such as a system information sequence number, etc.) or a type identifier (such as type identifier 1 for a D2D service, and type identifier 2 for a vehicle networking communication service), and so on. For example, if the terminal needs to be moved to a target cell, identification information of the target cell needs to be obtained. And for another example, if the terminal needs D2D (Device-to-Device) communication, it only needs system information corresponding to D2D, namely information such as system information serial number or type identifier corresponding to D2D information.

It should be noted that different system messages have different requirements on transmission time limit. For example, for an earthquake and tsunami warning system, a system message of the system is used for promptly releasing emergency information such as an earthquake and tsunami to the public to guide the public to avoid risks and self-rescue. Therefore, the system message needs to be sent preferentially. And For another example, satellite positioning information required by a terminal in an application of the vehicle networking service also needs to be sent preferentially. Therefore, in order to ensure the priority transmission of a high-priority service system message, in another embodiment of the present disclosure, the system request message may comprise a corresponding sending priority, and the sending priority is used for enabling the base station to send the service system message according to the sending priority. For example, a system request message for requesting a system message of the earthquake and tsunami warning system may comprise a high priority, and in a subsequent step, after receiving the system request message, the base station preferentially sends the system message of the earthquake and tsunami warning system according to the high priority.

In another possible implementation manner of the present disclosure, the system request message comprises a transmission restriction time, and the transmission restriction time is used for enabling the base station to send the service system message before the transmission restriction time is reached.

Wherein the system request message may comprise time delay indication information, and the time delay indication information is used for indicating the transmission restriction time. For example, time delay indication information corresponding to 1 ms (equivalent to transmission restriction time) is 00; time delay indication information corresponding to 2 ms (equivalent to transmission restriction time) is 01; time delay indication information corresponding to 5 ms (equivalent to transmission restriction time) is 10; and time delay indication information corresponding to 10 ms (equivalent to transmission restriction time) is 100. In this way, when a base station subsequently receives the system request message, and the time delay indication information in the system request message is 00, it is determined that the service system message needs to be sent to the terminal within 1 ms; when the base station subsequently receives the system request message, and the time delay indication information in the system request message is 01, it is determined that the service system message needs to be sent to the terminal within 2 ms; when the base station subsequently receives the system request message, and the time delay indication information in the system request message is 10, it is determined that the service system message needs to be sent to the terminal within 5 ms; and when the base station subsequently receives the system request message, and the time delay indication information in the system request message is 100, it is determined that the service system message needs to be sent to the terminal within 10 ms. Certainly, the correspondence between the foregoing time delay indication information and the transmission restriction time is only an example, which is not limited in the present disclosure.

S305, after receiving the system request message, the base station determining a statistical number corresponding to the service system message within a second preset time.

In this step, the statistical number corresponding to the service system message may be determined by any one of the following two methods:

Method 1: after the system request message is received, a first count value corresponding to the service system message requested by the system request message is increased by 1, and when the second preset time is reached, it is determined that the first count value is the statistical number.

In this method, each service system message corresponds to a counter. After a system request message for requesting a certain service system message is received, the count value recorded by the counter corresponding to the certain service system message is increased by 1.

For example, there are 12 service system messages in a system, which are recorded as: service system message 1, service system message 2, . . . service system message 12, and the initial count value of the counter of each service system message is 0. The base station receives the system request message; if it is determined by the identifier of the requested service system message in the system request message that the requested service system message is the service system message 1, the recorded count value of the counter corresponding to the service system message 1 is increased by 1; if it is determined by the identifier of the requested service system message in the system request message that the requested service system message is the service system message 2, the recorded count value of the counter corresponding to the service system message 2 is increased by 1. By analogy, when a system request message for requesting a certain service system message is received, the recorded count value of the counter corresponding to the certain service system message is increased by 1 so that the statistical number is obtained when the second preset time is reached.

Method 2: after the system request message is received, a second count value corresponding to a preset system message set in which the service system message requested by the system request message is located is increased by 1, and when the second preset time is reached, it is determined that the second count value is the statistical number, wherein the preset system message set comprises a plurality of different service system messages.

In this method, several service system messages may be preset as a preset system message set, and each preset system message set corresponds to a counter. After receiving the system request message, the base station determines a preset system message set in which the service system message requested by the system request message is located, and the recorded count value of the counter corresponding to the preset system message set is increased by 1.

For example, the 12 service system messages are still taken as an example. The 12 service system messages can be divided into three preset system message sets. Each preset system message set corresponds to one counter, and the initial count value of the counter corresponding to each preset system message set is 0, wherein service system message 1 to service system message 4 form a preset system message set a, service system message 5 to service system message 8 form a preset system message set b, and service system message 9 to service system message 12 form a preset system message set c. If it is determined by the identifier of the requested service system message in the system request message that the requested service system message is service system message 1, and it is determined that the preset system message set in which service system message 1 is located is the preset system message set a, the recorded count value of the counter corresponding to the preset system message set a is increased by 1; if it is determined by the identifier of the requested service system message in the system request message that the requested service system message is service system message 3, and it is determined that the preset system message set in which service system message 3 is located is still the preset system message set a, the recorded count value of the counter corresponding to the preset system message set a is further increased by 1; if it is determined by the identifier of the requested service system message in the system request message that the requested service system message is service system message 6, and it is determined that the preset system message set in which service system message 6 is located is the preset system message set b, the recorded count value of the counter corresponding to the preset system message set b is increased by 1. By analogy, when a system request message for requesting a certain service system message is received, the recorded count value of the counter corresponding to the preset system message set in which the certain service system message is located is increased by 1 so that the statistical number is obtained when the second preset time is reached.

S306, the base station sending the service system message to the terminal according to the statistical number.

In this step, the base station may send the service system message in the following two cases:

Case 1: when the statistical number is less than the preset number, the service system message is sent by using dedicated signaling, which is signaling transmitted on a physical dedicated control channel or on a physical shared data channel.

Wherein the dedicated signaling may be RRC (Radio Resource Control Protocol) signaling or NAS (Non-access stratum) signaling.

It should be noted that, when the statistical number is less than the preset number, it means that there is less demands for the same service system message within the second preset time. Therefore, the one-to-one transmission of the service system message to a terminal by using dedicated signaling can improve the transmission efficiency of the service system message.

Case 2: when the statistical number is greater than or equal to the preset number, the service system message is broadcasted.

It should be noted that, when the statistical number is greater than or equal to a preset number, it means that there is more demands for the same service system message within the second preset time. Therefore, the transmission of the service system message to a terminal is performed in the form of broadcasting without using the one-to-one transmission, thereby reducing signaling overhead and saving transmission resources.

In the above method embodiments, a series of action combinations are described for the sake of simple description. However, those skilled in the art should be aware that the present invention is not limited by the described sequence of actions. Secondly, those skilled in the art should also be aware that the embodiments described in the description are preferred embodiments and that the actions and modules involved are not necessarily required by the present invention.

Using the above methods, the terminal can flexibly obtain a service system message according to needs, and does not need to obtain all service system messages from the base station, thereby reducing system energy consumption and resource overhead.

Figure 4:
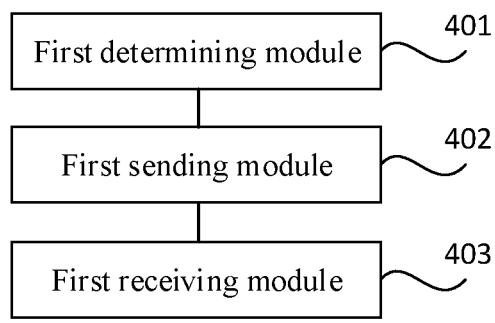
FIG. 4 is a schematic diagram of an apparatus for obtaining a system message provided by an embodiment of the present disclosure.

FIG. 4 shows an apparatus for obtaining a system message provided by an embodiment of the present disclosure. As shown in FIG. 4, the apparatus is applied to a terminal, and the apparatus comprises:

a first determining module 401 configured to determine, after a first basic system message of a current cell sent by a base station is received, whether a service system message needs to be obtained;

a first sending module 402 configured to send, to the base station, a system request message for requesting the service system message when it is determined that the service system message needs to be obtained; and a first receiving module 403 configured to receive the service system message sent by the base station according to the system request message.

Optionally, the first basic system message comprises parameter information required for the terminal to access or camp on the current cell; the service system message comprises a system message related to terminal mobility or a service requirement.

Optionally, the first determining module 401 is configured to determine whether the service system message needs to be obtained by the following conditions:

when the terminal stores other system messages or a second basic system message of a target cell to which the terminal is to be moved, it is determined that the service system message does not need to be obtained; the second basic system message comprises parameter information required for the terminal to access or camp on the target cell;

when the terminal stores neither other system messages nor the second basic system message of the target cell, and the terminal is not moved, it is determined that the service system message does not need to be obtained;

when the terminal stores neither other system messages nor the second basic system message of the target cell, and the terminal has been moved to the target cell, if a receiving power or a receiving quality of a reference symbol of the current cell is greater than or equal to a first preset threshold, it is determined that the service system message does not need to be obtained;

when the terminal stores neither other system messages nor the second basic system message of the target cell, and the terminal has been moved to the target cell, if a receiving power or a receiving quality of a reference symbol of the current cell is less than the first preset threshold, it is determined that the service system message needs to be obtained; and when the terminal initiates a service requirement, it is determined that the service system message needs to be obtained.

Figure 5:
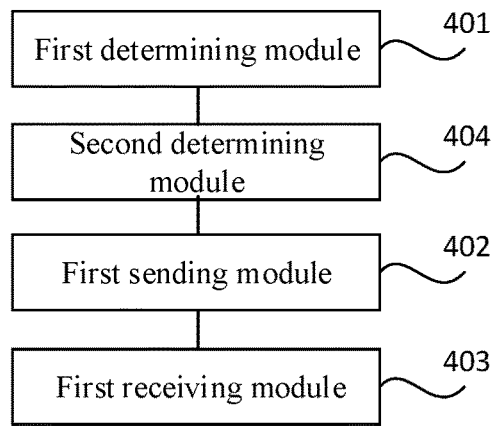
FIG. 5 is another schematic diagram of an apparatus for obtaining a system message provided by an embodiment of the present disclosure.

Optionally, as shown in FIG. 5, the apparatus further comprises:

a second determining module 404 configured to determine whether the service system message sent by the base station is received within a first preset time.

The first sending module 402 is configured to send to the base station a system request message for requesting the service system message when the service system message is not received within the first preset time.

Optionally, the system request message comprises a sending priority, and the sending priority is used for enabling the base station to send the service system message according to the sending priority.

Optionally, the system request message comprises a transmission restriction time, and the transmission restriction time is used for enabling the base station to send the service system message before the transmission restriction time is reached.

Using the above method, a terminal can flexibly obtain a service system message according to needs, and does not need to obtain all service system messages from the base station, thereby reducing system energy consumption and resource overhead.

Figure 6:
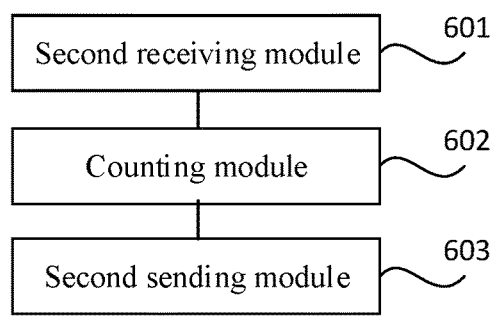
FIG. 6 is yet another schematic diagram of an apparatus for obtaining a system message provided by an embodiment of the present disclosure.

FIG. 6 shows an apparatus for obtaining a system message provided by an embodiment of the present disclosure. As shown in FIG. 6, the apparatus is applied to a base station, and the apparatus comprises:

a second receiving module 601 configured to receive a system request message, sent by a terminal, for requesting a service system message;

a counting module 602 configured to determine a statistical number corresponding to the service system message within a second preset time, wherein the statistical number represents a recorded number when the service system message is requested; and a second sending module 603 configured to send the service system message to the terminal according to the statistical number.

Optionally, the service system message comprises a system message related to terminal mobility or a service requirement.

Optionally, the counting module 602 configured to, after the system request message is received, add 1 to a first count value corresponding to the service system message requested by the system request message, and when the second preset time is reached, determine that the first count value is the statistical number.

Optionally, the counting module 602 configured to, after the system request message is received, add 1 to a second count value corresponding to a preset system message set in which the service system message requested by the system request message is located, and when the second preset time is reached, determine that the second count value is the statistical number, wherein the preset system message set comprises a plurality of different service system messages.

Optionally, the second sending module 603 is configured to broadcast the service system message when the statistical number is greater than or equal to a preset number and send the service system message by using dedicated signaling when the statistical number is less than the preset number, wherein the dedicated signaling is signaling transmitted on a physical dedicated control channel or on a physical shared data channel.

Optionally, the system request message comprises a sending priority, and the second sending module 603 is configured to send the service system message to the terminal according to the statistical number based on the sending priority.

Optionally, the system request message comprises a transmission restriction time, and the second sending module 603 is configured to send the service system message to the terminal according to the statistical number before the transmission restriction time is reached.

Using the above apparatus, a base station can flexibly send a system message according to the needs of the terminal, and does not need to periodically send all system messages, thereby reducing system energy consumption and resource overhead.

Figure 7:
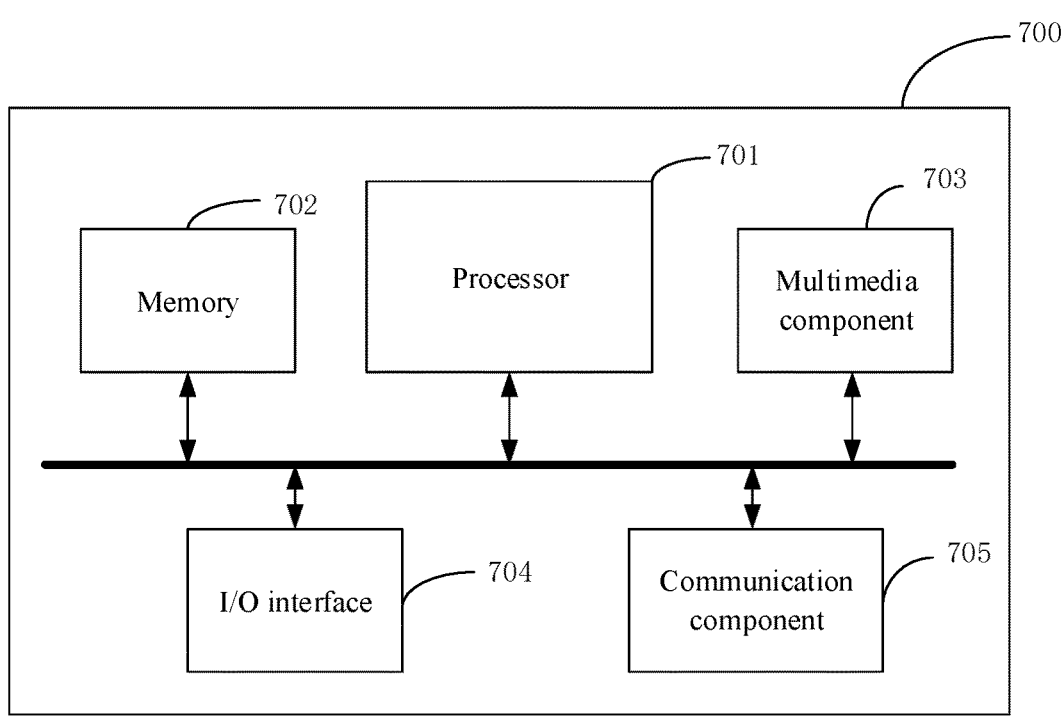
FIG. 7 is a schematic diagram of hardware of an apparatus for obtaining a system message provided by an embodiment of the present disclosure.

FIG. 7 is a block diagram of an apparatus for obtaining a system message provided by an embodiment of the present disclosure. As shown in FIG. 7, the apparatus may be applied to a terminal or a base station. The apparatus 700 may comprise a processor 701, a memory 702, a multimedia component 703, an input/output (I/O) interface 704, and a communication component 705.

Wherein the processor 701 is configured to control an overall operation of the apparatus 700 to complete all or part of the steps of the method for obtaining a system message. The memory 702 is configured to store various types of data to support operations at the apparatus 700; for example, the data may comprise instructions for any application or methods operated on the apparatus 700, and data related to applications, such as contact data, sent and received messages, pictures, audio, video, etc.

The memory 702 may be implemented by any type of volatile or non-volatile storage terminal device or a combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk or optical disk. The multimedia component 703 may comprise a screen and an audio component. The screen may be, for example, a touch screen, and the audio component is configured to output and/or input an audio signal. For example, the audio component may comprise a microphone for receiving an external audio signal. The received audio signal may be further stored in memory 702 or sent via the communication component 705. The audio component further comprises at least one speaker for outputting an audio signal. The I/O interface 704 provides an interface between the processor 701 and other interface modules. The other interface modules may be keyboards, mice, buttons, and the like. These buttons can be virtual buttons or physical buttons. The communication component 705 is configured to perform wired or wireless communication between the apparatus 700 and other terminal devices. For example, the wireless communication comprises Wi-Fi, Bluetooth, Near Field Communication (NFC), 2G, 3G or 4G, or a combination of one or more thereof, so the communication component 705 correspondingly may comprise: a Wi-Fi module, a Bluetooth module, and an NFC module.

In an exemplary embodiment, the apparatus 700 may be implemented by one or more of Application Specific Integrated Circuit (ASIC), Digital Signal Processor (DSP), and Digital Signal Processing Device (DSPD), Programmable Logic Device (PLD), Field Programmable Gate Array (FPGA), controller, microcontroller, microprocessor or other electronic components to perform the methods for obtaining a system message.

An embodiment of the present disclosure further provides a non-transitory computer readable storage medium 1, wherein the non-transitory computer readable storage medium 1 comprises one or more programs for performing a method for obtaining a system message. The method comprises: after a first basic system message of a current cell sent by a base station is received, determining whether a service system message needs to be obtained; when it is determined that the service system message needs to be obtained, sending, to the base station, a system request message for requesting the service system message; and receiving the service system message sent by the base station according to the system request message.

Optionally, the first basic system message comprises parameter information required for the terminal to access or camp on the current cell; the service system message comprises a system message related to terminal mobility or a service requirement.

Optionally, determining whether a service system message needs to be obtained comprises: determining whether the service system message needs to be obtained by the following conditions:

when the terminal stores other system messages or a second basic system message of a target cell to which the terminal is to be moved, it is determined that the service system message does not need to be obtained; the second basic system message comprises parameter information required for the terminal to access or camp on the target cell;

when the terminal stores neither other system messages nor the second basic system message of the target cell, and the terminal is not moved, it is determined that the service system message does not need to be obtained;

when the terminal stores neither other system messages nor the second basic system message of the target cell, and the terminal has been moved to the target cell, if a receiving power or a receiving quality of a reference symbol of the current cell is greater than or equal to a first preset threshold, it is determined that the service system message does not need to be obtained;

when the terminal stores neither other system messages nor the second basic system message of the target cell, and the terminal has been moved to the target cell, if a receiving power or a receiving quality of a reference symbol of the current cell is less than the first preset threshold, it is determined that the service system message needs to be obtained; and when the terminal initiates a service requirement, it is determined that the service system message needs to be obtained.

Optionally, before sending, to the base station, the system request message for requesting the service system message, the method further comprises: determining whether the service system message sent by the base station is received within a first preset time; sending, to the base station, a system request message for requesting the service system message comprises: sending, to the base station, a system request message for requesting the service system message when the service system message is not received within the first preset time.

Optionally, the system request message comprises a sending priority, and the sending priority is used for enabling the base station to send the service system message according to the sending priority.

Optionally, the system request message comprises a transmission restriction time, and the transmission restriction time is used for enabling the base station to send the service system message before the transmission restriction time is reached.

An embodiment of the present disclosure further provides a terminal 2, comprising:

the non-transitory computer readable storage medium 1, and one or more processors for executing programs in the non-transitory computer readable storage medium 1.

An embodiment of the present disclosure further provides a non-transitory computer readable storage medium 3, wherein the non-transitory computer readable storage medium 3 comprises one or more programs for performing a method for obtaining a system message. The method comprises: receiving a system request message, sent by a terminal, for requesting a service system message; determining a statistical number corresponding to the service system message within a second preset time; and sending the service system message to the terminal according to the statistical number, wherein the statistical number represents a recorded number when the service system message is requested.

Optionally, the service system message comprises a system message related to terminal mobility or a service requirement.

Optionally, determining a statistical number corresponding to the service system message within a second preset time comprises: after the system request message is received, adding 1 to a first count value corresponding to the service system message requested by the system request message, and when the second preset time is reached, determining that the first count value is the statistical number.

Optionally, determining a statistical number corresponding to the service system message within a second preset time comprises: after the system request message is received, adding 1 to a second count value corresponding to a preset system message set in which the service system message requested by the system request message is located, and when the second preset time is reached, determining that the second count value is the statistical number, wherein the preset system message set comprises a plurality of different service system messages.

Optionally, sending the service system message to the terminal according to the statistical number comprises: broadcasting the service system message when the statistical number is greater than or equal to a preset number; sending the service system message by using dedicated signaling when the statistical number is less than the preset number, wherein the dedicated signaling is signaling transmitted on a physical dedicated control channel or on a physical shared data channel.

Optionally, the system request message comprises a sending priority, and sending the service system message to the terminal according to the statistical number comprises: sending the service system message to the terminal according to the statistical number based on the sending priority.

Optionally, the system request message comprises a transmission restriction time, and sending the service system message to the terminal according to the statistical number comprises: sending the service system message to the terminal according to the statistical number before the transmission restriction time is reached.

An embodiment of the present disclosure further provides a base station 4, comprising:
the non-transitory computer readable storage medium 3, and
one or more processors for executing programs in the non-transitory computer readable storage medium 3.

The preferred embodiments of the present disclosure have been described in detail above in conjunction with the drawings. However, the present disclosure is not limited to the specific details of the above embodiments, and various simple variations can be made to the technical solutions of the present disclosure within the scope of the technical concept of the present disclosure. These simple variations are all within the protection scope of the present disclosure.

It should be further noted that the specific technical features described in the above specific embodiments may be combined in any suitable manner without contradiction. In order to avoid unnecessary repetition, the present disclosure will not elaborate separately on various possible combinations.

In addition, any combination of various embodiments of the present disclosure may be also made as long as it does not deviate from the idea of the present disclosure, and should also be regarded as the contents of the present disclosure.

The invention claimed is:

1. A method for obtaining a system message, applied to a terminal, comprising:
after a first basic system message of a current cell sent by a base station is received, determining whether a service system message needs to be obtained;
when it is determined that the service system message needs to be obtained, sending, to the base station, a system request message for requesting the service system message; and
receiving the service system message sent by the base station according to the system request message;
wherein determining whether a service system message needs to be obtained comprises:
determining whether the service system message needs to be obtained by the following conditions:
when the terminal stores other system messages or a second basic system message of a target cell to which the terminal is to be moved, it is determined that the service system message does not need to be obtained; the second basic system message comprises parameter information required for the terminal to access or camp on the target cell;
when the terminal stores neither other system messages nor the second basic system message of the target cell, and the terminal is not moved, it is determined that the service system message does not need to be obtained;
when the terminal stores neither other system messages nor the second basic system message of the target cell, the terminal has been moved to the target cell, and a receiving power or a receiving quality of a reference symbol of the current cell is greater than or equal to a first preset threshold, it is determined that the service system message does not need to be obtained;
when the terminal stores neither other system messages nor the second basic system message of the target cell, the terminal has been moved to the target cell, and a receiving power or a receiving quality of a reference symbol of the current cell is less than the first preset threshold, it is determined that the service system message needs to be obtained; and
when the terminal initiates a service requirement, it is determined that the service system message needs to be obtained.

2. The method of claim 1, wherein the first basic system message comprises parameter information required for the terminal to access or camp on the current cell; the service system message comprises a system message related to terminal mobility or a service requirement.

3. The method of claim 1, wherein before sending, to the base station, a system request message for requesting the service system message, the method further comprises:
determining whether the service system message sent by the base station is received within a first preset time;
sending, to the base station, a system request message for requesting the service system message comprises:
sending, to the base station, a system request message for requesting the service system message when the service system message is not received within the first preset time.

4. The method of claim 1, wherein the system request message comprises a sending priority, and the sending priority is used for enabling the base station to send the service system message according to the sending priority.

5. The method of claim 1, wherein the system request message comprises a transmission restriction time, and the transmission restriction time is used for enabling the base station to send the service system message before the transmission restriction time is reached.

6. A non-transitory computer readable storage medium, wherein the non-transitory computer readable storage medium comprises one or more programs for performing a method for obtaining a system message, applied to a terminal, comprising:
after a first basic system message of a current cell sent by a base station is received, determining whether a service system message needs to be obtained;
when it is determined that the service system message needs to be obtained, sending, to the base station, a system request message for requesting the service system message; and receiving the service system message sent by the base station according to the system request message;
wherein determining whether a service system message needs to be obtained comprises:
determining whether the service system message needs to be obtained by the following conditions:
when the terminal stores other system messages or a second basic system message of a target cell to which the terminal is to be moved, it is determined that the service system message does not need to be obtained; the second basic system message comprises parameter information required for the terminal to access or camp on the target cell;

when the terminal stores neither other system messages nor the second basic system message of the target cell, and the terminal is not moved, it is determined that the service system message does not need to be obtained;

when the terminal stores neither other system messages nor the second basic system message of the target cell, the terminal has been moved to the target cell, and a receiving power or a receiving quality of a reference symbol of the current cell is greater than or equal to a first preset threshold, it is determined that the service system message does not need to be obtained;

when the terminal stores neither other system messages nor the second basic system message of the target cell, the terminal has been moved to the target cell, and a receiving power or a receiving quality of a reference symbol of the current cell is less than the first preset threshold, it is determined that the service system message needs to be obtained; and when the terminal initiates a service requirement, it is determined that the service system message needs to be obtained.

7. A terminal, comprising:

a non-transitory computer readable storage medium, wherein the non-transitory computer readable storage medium comprises one or more programs for performing a method for obtaining a system message, applied to a terminal, comprising:

after a first basic system message of a current cell sent by a base station is received, determining whether a service system message needs to be obtained;

when it is determined that the service system message needs to be obtained, sending, to the base station, a system request message for requesting the service system message; and receiving the service system message sent by the base station according to the system request message, and one or more processors for executing programs in the non-transitory computer readable storage medium;

wherein determining whether a service system message needs to be obtained comprises:

determining whether the service system message needs to be obtained by the following conditions:

when the terminal stores other system messages or a second basic system message of a target cell to which the terminal is to be moved, it is determined that the service system message does not need to be obtained; the second basic system message comprises parameter information required for the terminal to access or camp on the target cell;

when the terminal stores neither other system messages nor the second basic system message of the target cell, and the terminal is not moved, it is determined that the service system message does not need to be obtained;

when the terminal stores neither other system messages nor the second basic system message of the target cell, the terminal has been moved to the target cell, and a receiving power or a receiving quality of a reference symbol of the current cell is greater than or equal to a first preset threshold, it is determined that the service system message does not need to be obtained;

when the terminal stores neither other system messages nor the second basic system message of the target cell, the terminal has been moved to the target cell, and a receiving power or a receiving quality of a reference symbol of the current cell is less than the first preset threshold, it is determined that the service system message needs to be obtained; and when the terminal initiates a service requirement, it is determined that the service system message needs to be obtained.

* * * * *